United States Patent [19]

Lucke

[11] Patent Number: 5,211,106
[45] Date of Patent: May 18, 1993

[54] APPARATUS AND METHOD FOR COOKING CASINGLESS SHAPED FOOD PRODUCTS

[75] Inventor: Donald E. Lucke, Madison, Wis.

[73] Assignee: Oscar Mayer Foods Corporation, Madison, Wis.

[21] Appl. No.: 703,933

[22] Filed: May 22, 1991

[51] Int. Cl.⁵ .................................. A47J 43/18
[52] U.S. Cl. ........................ 99/441; 99/450; 99/474; 99/477; 34/232; 219/400
[58] Field of Search ............... 99/441, 450, 474-477, 99/447, 483; 34/10, 57 A, 219, 223, 225, 232; 126/21 A; 219/400

[56] References Cited

U.S. PATENT DOCUMENTS

| | | | |
|---|---|---|---|
| 120,253 | 10/1871 | Endemann | 34/232 |
| 2,418,683 | 4/1947 | Wilson | 34/219 |
| 2,843,037 | 5/1956 | Waas . | |
| 3,040,439 | 6/1962 | Frost | 34/57 A |
| 3,221,729 | 12/1965 | Beasley et al. | 99/450 |
| 3,517,606 | 6/1970 | Myles et al. | 99/450 |
| 3,543,414 | 1/1969 | Gomarin | 34/57 A |
| 4,110,916 | 9/1978 | Bemrose | 99/483 |
| 4,455,478 | 6/1984 | Guibert | 219/400 |
| 4,468,865 | 9/1984 | Inagaki . | |
| 4,472,887 | 9/1984 | Avedian et al. | 34/219 |
| 4,521,378 | 6/1985 | Ichimura et al. | 34/57 A |
| 4,530,632 | 7/1985 | Sela . | |
| 4,576,090 | 3/1986 | Burtea | 99/477 |
| 4,622,228 | 11/1986 | Ikeruchi et al. . | |
| 4,676,152 | 6/1987 | Tsuji et al. . | |
| 4,785,551 | 11/1988 | Meyer | 34/57 A |

FOREIGN PATENT DOCUMENTS

| | | | |
|---|---|---|---|
| 3010007 | 10/1981 | Fed. Rep. of Germany | 34/57 A |
| 674935 | 7/1952 | United Kingdom | 34/10 |

Primary Examiner—Harvey C. Hornsby
Assistant Examiner—Mark Spisich
Attorney, Agent, or Firm—Lockwood, Alex, FitzGibbon & Cummings

[57] ABSTRACT

An apparatus and a method for cooking a casingless food product such as a casingless sausage or the like is provided. The apparatus includes a tray to support a plurality of casingless sausages and the like which nest within laterally extending recessed areas and the tray is provided with a plurality of pores or slots extending therethrough. The tray is positioned within an oven housing and separates the interior thereof into a first space above the tray and a second space below the tray. The air within the housing is heated and the second space is pressurized to a positive pressure over that within the first space to provide for the forced escape of heated air from the second space into the first space through the pores in the tray to thereby lift the casingless food product above the surface of the tray and to cook the food product while suspended above the tray. The pores or slots within the tray are oriented to direct the flow of air to both lift the food product above the surface of the tray while simultaneously rotating it over the surface to provide uniform and even cooking of the food product.

9 Claims, 2 Drawing Sheets

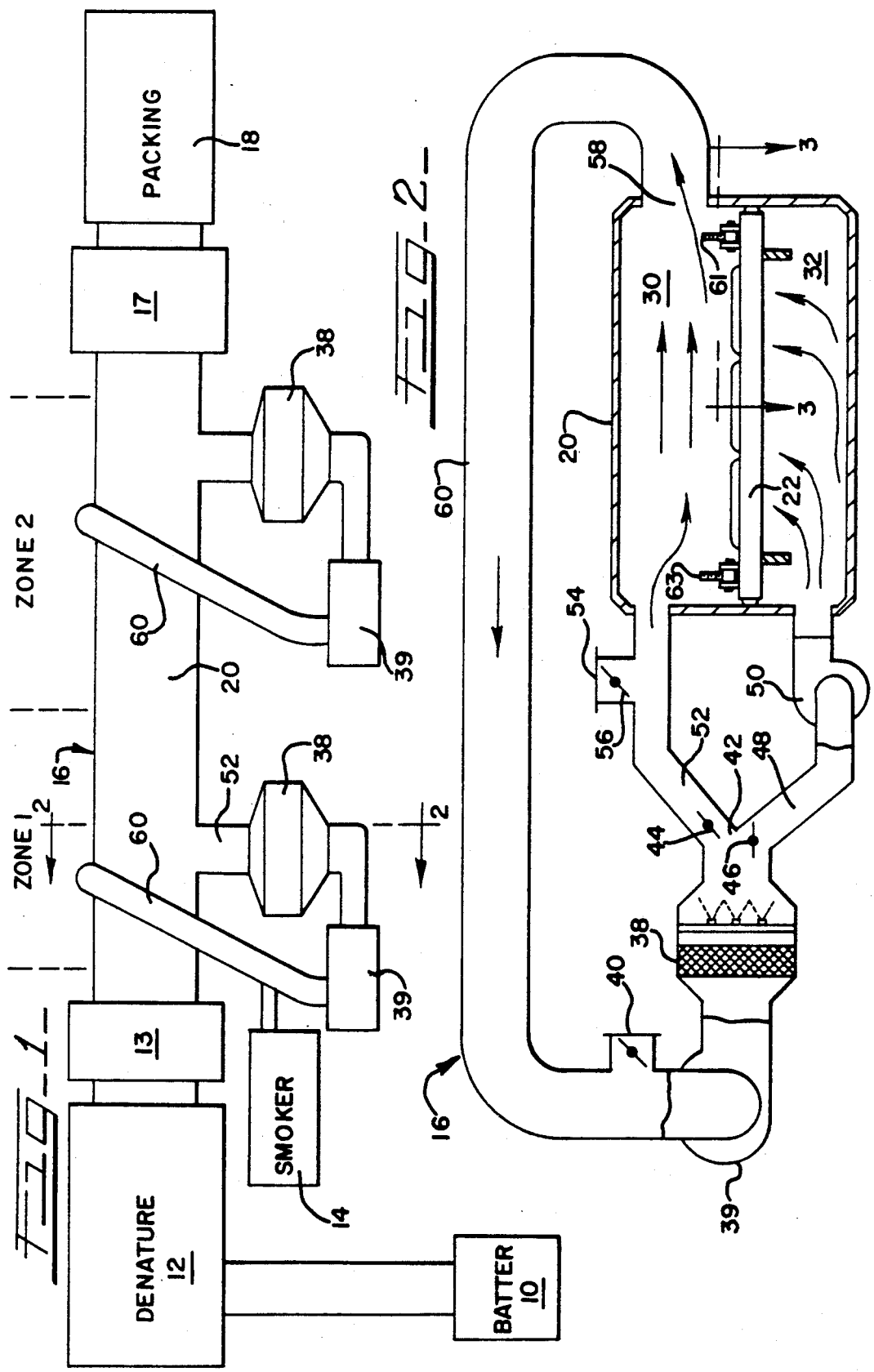

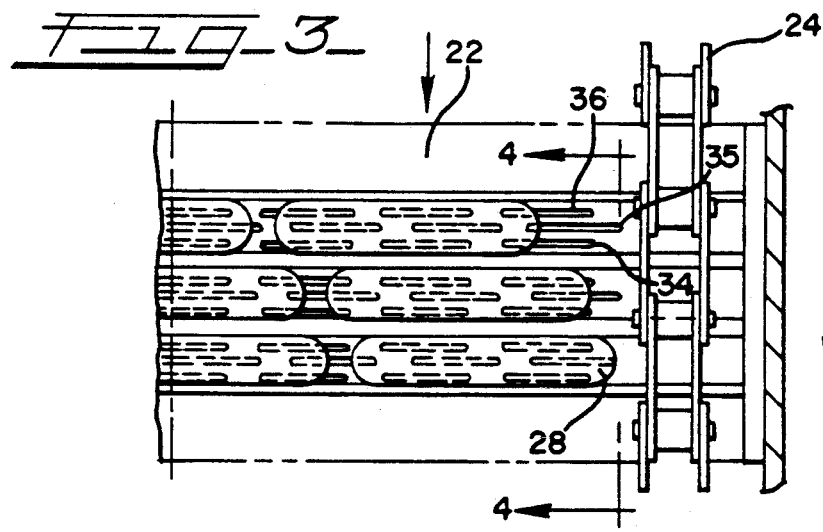
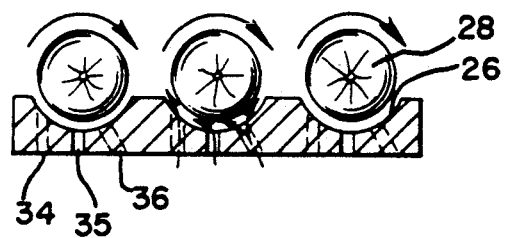
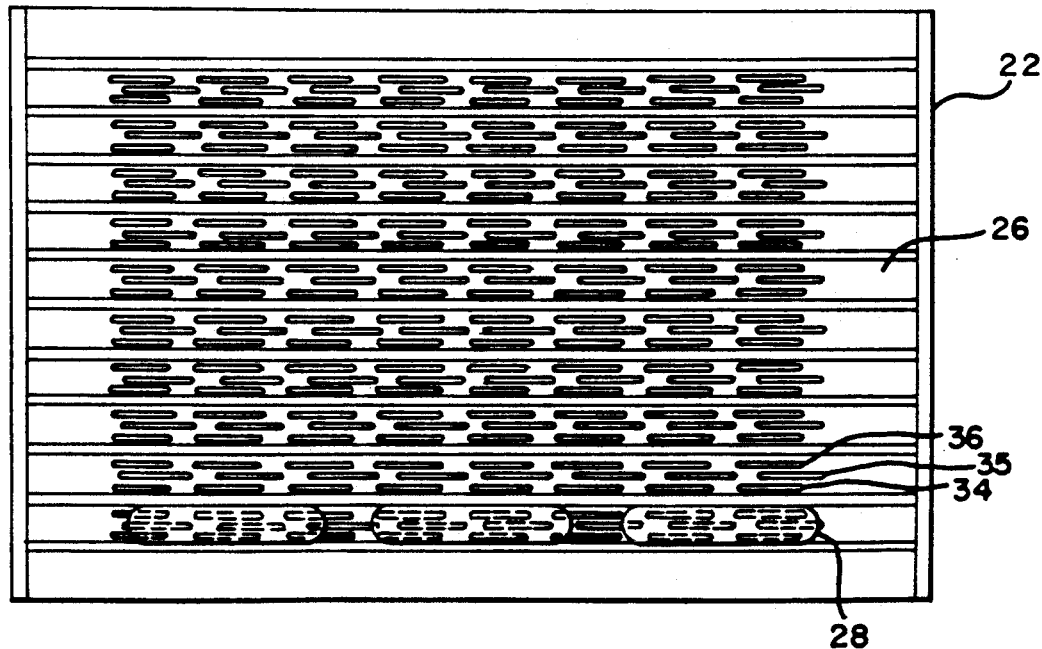

APPARATUS AND METHOD FOR COOKING CASINGLESS SHAPED FOOD PRODUCTS

BACKGROUND AND SUMMARY OF THE INVENTION

The subject invention generally relates to an apparatus and method for cooking a casingless shaped food product. More particularly, the invention relates to an apparatus and method for cooking a casingless shaped product, such as a casingless sausage and the like, by the use of heated pressurized air to lift and suspend a meat product above a conveying surface. The pressurized air lifts and rotates each casingless product above the conveying surface while additional heated air is also circulated above the product to provide the necessary process conditions to adequately cook the product prior to packaging.

Casingless shaped products, such as a casingless sausage and the like are known. Such shaped products are generally formed by a surface chemical denaturing process wherein a fresh meat product in a batter-like state is formed by treating the product, such as by heating for example, to form a skin around the formed batter.

Various methods and devices have been developed in the art to cook sausage-like products. In general, the uncooked product is conveyed along a process line through a cooking chamber or oven. The uncooked product can be cooked in a tray wherein the product itself is supported within a compatibly formed surface thereof. Such formed surfaces provide adequate support during cooking for sausages and the like which have been prepared with a traditional casing. The less rigid nature of an uncooked casingless food product, such as casingless sausages, generally require a more refined cooking apparatus which will prevent product discoloration and/or deformities in the product while the product is still in a fresh batter-like state during the initial stages of cooking. Most preferably, a casingless food product should be free from surface contact during the cooking step at least until the fresh batter is congealed to the point where it will no longer deform under minor pressures applied to the surface thereof. Such an apparatus has previously been unavailable.

The present invention overcomes the shortcomings of the prior art by providing a method and an apparatus for cooking casingless food products wherein the uncooked batter-like product is substantially free from detrimental surface pressures during cooking. In the embodiment described herein, the uncooked casingless product is positioned within a cooking chamber and is cooked while suspended above a conveyed support surface. In the preferred embodiment, the product is cooked while suspended above a formed tray by the use of pressurized air which is directed through a plurality of pores or slots which extend through the support surface of the tray. The pressurized air suspends and rotates the product above the support surface of the tray while the product is in the cooking chamber and the air is heated to simultaneously cook the suspended product. Hot air may also be circulated over the product and the support surface to provide a uniform temperature in the cooking chamber.

The cooking apparatus of the present invention can be incorporated into a system which includes means for stuffing and shaping a flowable batter material, an optional smoker and a packaging apparatus. The product can be conveyed through the entire system along a conveyor line and within the aforementioned formed trays which are manufactured to hold a plurality of the formed links.

It is accordingly an object of the present invention to provide a cooking apparatus to cook a casingless formed food product such as a casingless sausage and the like.

It is another object of the present invention to provide an apparatus for cooking a casingless food product such as a casingless sausage and the like which utilizes pressurized air to suspend the product above a conveying surface during cooking.

It is another object of the present invention to provide a process for cooking a casingless food product wherein the product is cooked while suspended above a conveying surface.

These and other objects and advantages of the present invention will be appreciated by those skilled in the art upon further consideration of the remainder of the disclosure including the detailed description and the claims.

DETAILED DESCRIPTION OF THE DRAWINGS

Reference is made herein to the various Figures wherein like numerals indicate like elements and wherein:

FIG. 1 is a top plan view of a sausage processing line incorporating features of the present invention;

FIG. 2 is an enlarged elevational view, in section, taken along the 2—2 line of FIG. 1;

FIG. 3 is a top plan view, in section, taken along the 3—3 line of FIG. 2;

FIG. 4 is a side elevational view taken along the 4—4 line of FIG. 3;

FIG. 5 is a top plan view of a tray made in accordance with the present invention.

DESCRIPTION OF THE PREFERRED EMBODIMENT

FIG. 1 illustrates a layout for a sausage processing line incorporating the present invention. A batter preparation apparatus 10 includes mixing and forming assemblies of generally known construction by which components such as sausage ingredients are combined and blended to a desired product identity, consistency, taste and the like into a pumpable batter. The batter preparation apparatus 10 feeds into a shaping apparatus 12 which forms shaped products or blanks which are ejected onto a conveyor assembly. The stuffing and shaping apparatus 12 can be of different designs wherein a batter-like substance is formed into a shaped product or blank which is subjected to further treatment to impart a skin or outer coating on the shaped product to maintain the product in its formed shape for further processing. A suitable forming and shaping apparatus for the present invention is described in U.S. Pat. No. 4,989,505, issued Feb. 5, 1991, the subject matter of which is incorporated by reference hereinto.

Uncooked casingless food products can then be processed as needed or desired. For example, sausage products can be first rinsed and/or dried at a pre-conditioning station 13 which can be of generally known construction. FIG. 1 illustrates the cooking and packaging arrangement which can be utilized or eliminated as desired. A zoned cooking apparatus 16, further discussed below, forms part of the sausage processing line to cook the formed product prior to packaging. A second or post-conditioning station 17 may be provided to chill, rinse and/or dry the cooked sausage prior to packaging.

With more particular reference to the cooking apparatus 16, the invention provides a zoned cooking apparatus with each zone therein providing increased temperatures to progressively cook the sausage product as it is conveyed through the processing line. For illustrative purposes, FIG. 1 depicts two such heating zones, zone I and zone II, each substantially identically equipped. In explaining the preferred embodiment herein, the description will be limited principally to the features of zone I.

The cooking apparatus includes a housing 20 which provides the main cooking compartment for cooking the casingless food products therein. In the preferred embodiment, the casingless food products or links 28 are positioned within the housing 20 on a support means which is provided as a tray 22 which is conveyed along the processing line in a conventional manner, such as by a conventional chain drive. The tray is configured to include a plurality of depressions 26 therein which are dimensioned to retain a number of links 28 within each such depression 26, substantially as shown in the various figures herein. In the depicted embodiment, the tray is configured to position casingless food product 28 within the housing 20 so that the links 28 are oriented within the depressions 26 to be perpendicular to its path of travel, as indicated by the arrow in FIG. 3. It will be appreciated, however, that the links 28 may also be oriented parallel to or in-line with their path of travel. The length of the tray should be sufficient to accommodate a maximum number of links 28 within the housing 20.

The tray 22, when positioned within the housing 20, separates the interior of the housing into two spaces including a first space 30 above the tray 22 and a second space 32, below the tray. Tray 22 is provided with a plurality of openings for the passage of air between the second space 32 and the first space 30. The openings 34, 35 and 36 (FIG. 4) extend between the lowermost surface of the tray 22 to the lowermost surface of the depressions 26 so that the links 28, when positioned within the depressions rest over the uppermost openings of the air slots 34, 35, and 36.

The cooking apparatus 16 is provided with means for heating the links 28 by the use of heated pressurized air which can be circulated throughout the interior of housing 20 and also recirculated to establish a flow of air across and from underneath the links 28 from an external heat process air source. The heated air, after circulating over and around the links 28 can exit through another opening in the first space 30 within housing 20. In the preferred embodiment depicted and discussed herein, the means for heating and cooking the links 28 generally include means for heating the air within the cooker 16 and means for directing heated air into the second space 32 under high pressure conditions such that a heated and pressurized stream of air, when forced into the second space 32 creates a condition wherein the air pressure in the second space 32 is greater than the pressure within first space 30.

Those skilled in the art will appreciate that the casingless links 28, when still in the initial stages of cooking, are easily deformed. Consequently, a preferred means for cooking the batter-like links 28 is one which will also protect them from excess contact pressures such as those experienced by the surface of the links 28 when positioned within the depressions 26 of the tray 22. In the present invention, the air flow directed into the second space 32 is sufficiently pressurized to force the air through the passages 34, 35 and 36 from the second space 32 and into the first space 30 to lift the links 28, positioned within depressions 26, and suspend the links above the surface of the tray to prevent any surface contact between the tray 22 and the links 28 during the cooking process. In this manner, deformities and discolorations in the product are prevented during the cooking process while the links 28 are still in a fresh batter-like state.

Cooking of the links 28 is accomplished by sufficiently heating the air within the housing 20 to a high enough temperature to cook the links 28 prior to packaging. Those skilled in the art will appreciate that the links 28 need not be cooked completely prior to packaging. Rather, it is possible to cook the links 28 to at least congeal the batter-like product for ease of subsequent handling. The links 28, after undergoing an initial cook step to congeal the batter, can be packaged at package station 18, for example, with an additional and final cook step following the packaging step. In this manner, an aseptic package of the desired products such as wieners, sausages and the like is provided and subsequent cooking by a hot-water cooking bath, by microwave cooking and the like results in the formation of an aseptic package, thereby eliminating the need for subsequent treatment to enhance shelf-life, such as temperature reduction devices. As used herein, the term "cooking" shall be understood to include full cooking of the links 28 as well as the aforementioned congealing thereof.

Heating and pressurizing of the air within the housing 20 is accomplished in the preferred embodiment herein by use of a heating assembly and a blower and a high pressure booster to first heat the air and then to pressurize at least a portion of the stream of air coming off of the heater. As shown in FIG. 2, a heater 38 and blower 39 are positioned to one side of the housing 20 in an arrangement which can be substantially closed to the outside atmosphere to set up a continuous circulation of air through the housing 20. The actual positions of the heater 38 and blower 39 are not critical and, if desired, they may be positioned either above or below the housing 20. The heater 38 and blower 39 are of a conventional design.

The air supply within the cooking assembly 16 can be opened to the outer atmosphere through a recloseable valve such as air intake port 40 and baffle 41 to allow fresh air to be pulled into the system and also for cooling and drying purposes. Air from the heater 38 and blower assembly 39 is directed into conventional ducts and through a Y-shaped junction 42 which splits the stream into either the lower second space 32 or the upper first space 30. Baffles 44 an 46 are provided to control the flow of air passing into the upper and lower spaces, respectively. Air flow into the lower space 32 passes through a lower branch 48 of the junction 42 and into a high pressure booster 50 which supplies the necessary pressurization to increase the pressure within the second space 32 to exceed the air pressure within the upper first space 30. Preferably, the pressure within the second space 32 will be proportioned to provide an air flow through slots 34, 35 and 36 to suspend link 28 during cooking. It should also be understood that the use of the high pressure booster 50 to heat the air within the apparatus 16, while a preferred embodiment, is not to be construed as a limitation in any way. Moreover, other pressure means are available to those in the art such as the use of dampers 56 and 44 to create differential pressures between spaces 30 and 32.

A stream of heated air is also directed through the upper space 30 through an upper branch 52 of junction 42. An exhaust port 54 and baffle 56 is provided to vent the heated air to the atmosphere for cooling drying and smoke exhaust purposes, for example. Air flow through the housing 20 is directed horizontally across the first space 30 to pass over and around the links 28 and to exit through an exit port, generally indicated at 58. Recirculation loop 60 connects the exit port 58 with the heater 38 and blower 39 to recirculate the air within the cooking apparatus 66 In this arrangement, the heater 38 can be cycled on and off to maintain the desired temperature within the cooking apparatus 16 once a proper cooking temperature has been achieved, thereby providing an essentially closed heating zone which is energy efficient and cost effective. As known in the art and as shown in FIG. 1, multiple process zones may be used within the processing line wherein each successive zone can be provided with different processing environments with respect to time, temperature, moisture and, to some extent, air velocity, to provide a flexible process line. In this manner, links 28 can be subjected to successively increasing temperatures as they pass from one process zone to the next and to a final zone maintained at a maximum desired final product temperature.

Regarding the passages 34, 35 and 36 within the tray 22, the geometry of the passages are preferably configured in accordance with certain specifications to provide for a passage of air from the second space 32 up into the first space 30 to simultaneously lift and rotate the links 28 for uniform cooking along the entire surface thereof. While the present invention is not limited to any specific orientation for the air passages in the tray 22, the passages are preferably constructed to provide a first and second row of pores or slots 34 and 35, respectively, to be substantially vertically extending when the tray 22 is positioned within the housing 20. A third row of pores or slots 36, however, is preferably inclined, with respect to the rows 34 and 35, at an angle which is sufficient to direct the airflow in a manner which provides the necessary spin or rotation of the link 28 during the cooking process.

The tray may be constructed of a metal or plastic material. Most preferably, the tray is constructed from an oriented polymer material. The tray 22 is conveyed into the housing of the cooking apparatus 16 utilizing a chain drive so that the tray 22 is positioned between the chains 24 and 25, and guides 61 and 63, and support rails 62 and 64. In this manner, the tray is held in position to withstand the lifting force applied to the underside of the tray 22 by the high pressure booster 50 pressurizing the atmosphere within the second space 32. Following adequate cooking of the links 28, the tray 22 is moved on to the packaging stage of the manufacturing process where the links may be transferred from the tray 22. A second tray may then be loaded within the housing and the links thereon are cooked in the manner discussed herein. The empty conveying tray 22 may then pass through a washing station and returned to the loading end of the processing line to complete a continuous loop process, as known in the art.

Particularly efficient smoking of links 28 can be practiced in as much as the uncooked products do not have a casing, which would otherwise have to be penetrated by the smoke media when other devices are used. Facilities could also be provided for the utilization of liquid or natural smoke or other flavoring components or devices. If desired, smoke can be introduced directly into the cooking apparatus 16 such as by smoker 14 positioned along the cooking assembly at or around the blower 39 or burner assembly 38, for example.

It should be appreciated that other embodiments to the cooking apparatus 16 are contemplated as being within the scope of the present invention. For example, any apparatus which delivers pressurized gas through the pores or slots 34, 35 and 36 to suspend a casingless food product above the tray 22 or other support means is contemplated. Such an apparatus may be provided without enclosing a tray or support means within a housing, for example, and may include a hood or other gas-collecting means positioned over the tray 22 to collect and recirculate the gas delivered through the openings in the tray. Any such device which provides the means for lifting, rotating and cooking a casingless food product above a conveying surface by the use of pressurized and heated air and/or other gases is now contemplated.

Although a preferred embodiment of the present invention has been discussed and described in detail above, it will be appreciated that various changes and modifications to the preferred embodiment can be made by those skilled in the art without departing from the true spirit and scope of the invention as set forth in the following claims.

What is claimed is:

1. An apparatus for cooking a casingless food product, comprising:
   a housing;
   a tray positionable within said housing for supporting at least one casingless food product thereon, said tray separating the interior of said housing into a first space above said tray and a second space below said tray;
   said tray having a plurality of grooves shaped to nest at least one casingless food product therein;
   a plurality of openings extending through said tray and within said grooves for the passage of air between said second space and said first space, said casingless food product positionable within said grooves and over said openings;
   said openings provided within said grooves in an ordered arrangement having a first row, a second row and a third row, said first row and said second row of said openings extending through said tray in a substantially vertical orientation, said third row of said openings extending through said tray at an acute angle with respect to said first row and said second row;
   heating means for heating the air within at least said second space; and
   pressure means for pressurizing the air within said second space to a pressure greater than the pressure within said first space;
   whereby the heated and pressurized air in said second space passes through said openings to simultaneous lift said food product above said support means and to cook said food product.

2. The apparatus as described in claim 1, wherein said heating means includes a heater and a blower assembly positioned to provide heated air to said first space and said second space within said housing.

3. The apparatus as described in claim 2, wherein said heater and said blower are positioned outside of said housing and are connected thereto through heating ducts, said ducts being configured to split said heated air into a first stream and a second stream, said first stream entering said first space and said second stream entering said second space within said housing.

4. The apparatus as described in claim 3, wherein said pressure means is positioned outside of said housing and connected to said second space through said heating ducts, said second stream being directed through said pressure means to pressurize the air within aid second space.

5. The apparatus as described in claim 1 further comprising recirculation means for recalculating the air within said apparatus, said recirculation means including at least one recloseable vent for venting said apparatus to the ambient.

6. An apparatus for cooking a casingless food product, comprising:
- a tray for supporting at least one casingless food product thereon said tray having a plurality of grooves to nest at least one casingless food product therein;
- a plurality of openings extending through said tray to allow gas to pass therethrough, said at least one casingless food product being positioned over said openings when nesting within said grooves;
- said openings provided within said grooves in an ordered arrangement having a first row, a second row and a third row, said first row and said second row of said openings extending through said tray in a substantially vertical orientation, said third row of said openings extending through said tray at an acute angle with respect to said first row and said second row;
- gas directing means positioned below said tray for delivering pressurized gas through said openings to said at least one casingless food product, said pressurized gas passing through said openings at a velocity which is sufficient to lift and hold said at least one casingless food product above said tray; and
- heating means for cooking said at least one casingless food product while said product is held above said tray.

7. The apparatus as defined in claim 6 further comprising gas collecting means positioned above said tray for collecting gas which has passed through said openings in said tray.

8. The apparatus as defined in claim 7 further comprising recirculation means associated with said gas collecting means for recalculating the gas collected by said gas collecting means.

9. The apparatus as defined in claim 6, wherein said heating means includes a heater and a blower assembly positioned to deliver heated air above and below said tray.

* * * * *

UNITED STATES PATENT AND TRADEMARK OFFICE
CERTIFICATE OF CORRECTION

PATENT NO. : 5,211,106
DATED : May 18, 1993
INVENTOR(S) : Donald E. Lucke

It is certified that error appears in the above-indentified patent and that said Letters Patent is hereby corrected as shown below:

```
Column 7, line 12 "aid" should read --said--.
          line 15 "recalculating" should read --recirculating--.
Column 8, line 23 "recalculating" should read --recirculating--.
```

Signed and Sealed this

Twenty-fifth Day of January, 1994

Attest:

BRUCE LEHMAN

*Attesting Officer*   *Commissioner of Patents and Trademarks*